Patented Apr. 20, 1948

2,440,215

UNITED STATES PATENT OFFICE 2,440,215

TREATMENT OF IRON SULFATE LIQUORS

Louis N. Allen, Jr., Short Hills, N. J., and Walter K. Zahray, Bronx, N. Y., assignors to Chemical Construction Corporation, New York, N. Y., a corporation of Delaware No Drawing. Application March 21, 1946, Serial No. 656,174

4 Claims. (Cl. 23—126)

This invention relates to a method for the treatment of waste iron sulfate liquors containing free sulfuric acid, such as spent pickle liquors encountered in steel mills and acid ferrous sulfate solutions obtained as by-products in the manufacture of titanium dioxide pigments from ilmenite. It is a principal object of the invention to provide a method of separating a concentrated ferrous sulfate sludge from these and similar waste iron sulfate liquors that can be used for water purification, for the manufacture of iron oxide pigments, or for roasting under conditions such as to form a sulfur dioxide gas that can be reconverted to sulfuric acid by the contact process.

We have found that from about 40% to about 100% of the iron contained in spent iron sulfate liquors of the above type can be separated in the form of a concentrated ferrous sulfate monohydrate sludge by subjecting the liquors to a settling process while maintaining the temperature between about 100° C. and about 175°–200° C., provided certain conditions are observed. These conditions are, first, that the free acidity of the liquors is reduced to a point where the pH at ordinary temperatures is not below 2, and secondly, that substantially all the iron in the liquors is present in the ferrous condition. When these conditions are maintained, we find that the sludges having a ferrous sulfate content on the order of 25–35% $FeSO_4$ can be obtained from 10–15% $FeSO_4$ liquors by gravity separation for periods of about 10–20 minutes. These sludges solidify on cooling to masses of ferrous sulfate heptahydrate which can be dried in a current of hot gases and used for water purification. Alternatively, the sludges can be further dewatered by filtering, water evaporation or otherwise and subjected to roasting in admixture with about 10–14% carbon to produce a 5–7% $SO_2$ gas and an iron oxide that is well suited for use in blast furnaces.

When the process of our invention is applied to straight ferrous sulfate liquors containing little or no ferric sulfate, such as those obtained in titanium dioxide pigment manufacture, the sulfuric acid can be neutralized by any suitable means. Under these circumstances relatively cheap neutralizing agents such as limestone or calcium oxide or hydroxide may be used to obtain a pH higher than 2, or sodium hydroxide or carbonate may be employed if a pure ferrous sulfate product is desired. In treating spent pickle liquors, however, which contain considerable quantities of ferric sulfate, a reducing agent must be employed. For this reason we greatly prefer to treat these liquors with a metal above hydrogen in the electromotive force series of elements, and preferably with finely divided iron, since this treatment will simultaneously kill or reduce the acidity of the liquors to the necessary degree and also reduce substantially all the ferric sulfate to the ferrous condition. Preferably the iron is added in amounts in excess of those necessary to react with all the free sulfuric acid present, and the liquors may be heated to accelerate the neutralization of the free sulfuric acid.

As is noted above, the liquors must be heated to temperatures in excess of 100° C., and preferably to about 125°–175° C. in order to bring about the separation of the ferrous sulfate as a sludge. If desired, the iron sulfate liquors can be heated to these temperatures prior to the addition of the iron or other acid-neutralizing agent, but we prefer to carry out the acid-neutralizing step at a lower temperature so that an open reaction vessel may be used. This permits the escape of the hydrogen liberated during the acid neutralization. The neutralized and reduced liquors are then heated in a pressure vessel to the desired settling temperature and maintained at this temperature while the ferrous sulfate sludge is settled out and withdrawn. The hot supernatant liquor can then be passed in heat exchange with fresh iron sulfate liquor in order to recover part of its heat content if desired.

From the foregoing it is apparent that the process of our invention consists essentially in the steps of first reducing the free sulfuric acid content of waste sulfuric acid liquors to about 0.1% or less, corresponding to a pH of 2 or more, and reducing any ferric iron that may be present to the ferrous condition, and then maintaining the liquors at about 100°–200° C. under settling conditions. In order to prevent excessive evaporation it is usually advisable to carry out the settling step in a closed vessel under the autogenic pressure produced by the heating and by any hydrogen evolution that may take place, and a pressure vessel equipped with steam coils and with a Dorr thickener in the lower portion is very effective for this purpose. Preferably the vessel is equipped with a bottom outlet so that the separated sludge may be drawn off while maintaining substantially the same temperature and pressure conditions that were used for the settling. The sludge may be further dewatered if desired by injection into a chamber maintained at normal or reduced pressure, so that a part or all of the free water is removed by flash evaporation. Alternatively, the water may be removed by filtration, although this procedure is less desirable since a heated pressure filter or centrifuge would be necessary to prevent the sludge from immediately setting up as a mass of copperas crystals.

The process of our invention will be further illustrated by the following specific example, which shows by experimental evidence the results obtained under various operating conditions. It should be understood, however, that although this example may describe certain specific features of the invention, it is given primarily for purposes of illustration and the invention in its broader aspects is not limited thereto.

*Example*

Ferrous sulfate liquors having the compositions given in the following table were synthesized by dissolving 73 grams of copperas in water. To some of these solutions 27 grams of ferric sulfate were added, in order to approximate the content of a representative steel mill pickle liquor, and solutions 3 to 12 were acidified by adding 12 grams of 96% sulfuric acid. Finely divided iron was added to solutions 4 to 8 and mill scale to solution 9 and these liquors were heated with agitation until the evolution of hydrogen was substantially complete. They were then heated in a pressure vessel to the temperature indicated and allowed to stand for 10-20 minutes, after which the supernatant liquor was drawn off from the settled sludge while maintaining the same temperature. The liquor was tested for pH and free sulfuric acid and the liquor and sludge were analyzed for ferrous and ferric sulfates. The figure for "Per cent FeSO4 Recovery" gives the per cent of total iron sulfate in the liquor (including that formed from the iron added as such or as mill scale) that was recovered in the sludge.

waste iron sulfate liquors containing free sulfuric acid when the acidity of the acid is neutralized to a pH not lower than 2 and when substantially all the iron is in the ferrous condition. When these conditions are maintained at 53% recovery can be obtained at 125° C. and a 97% recovery at 175° C.; therefore it is usually unnecessary to exceed the latter temperature. However, temperatures up to 200° C. or even higher may be employed in some cases, as when more highly concentrated solutions are employed, and are included within the scope of the invention in its broader aspects.

What we claim is:

1. A method of treating a ferrous sulfate liquor containing free sulfuric acid which comprises adjusting the acidity of said liquor to a pH within the range of from 2 to about 4.3 and reducing any ferric iron that may be present to the ferrous condition by adding to the liquor a metal above hydrogen in the electromotive force series of elements, heating the liquor to a temperature of at least 100° C., subjecting the liquor to a settling process at said elevated temperature and thereby separating therefrom a ferrous sulfate sludge.

2. A method according to claim 1 in which the liquor is a spent pickle liquor.

3. A method according to claim 2 in which the added metal is iron.

4. A method according to claim 3 in which the temperature is maintained between 125° C. and 175° C. during separation of the ferrous sulfate sludge.

LOUIS N. ALLEN, Jr.
WALTER K. ZAHRAY.

REFERENCES CITED

The following references are of record in the file of this patent:

| No. | Temp., °C. | Composition of Liquor, Grams | | | | | Supernatant Liquor | | | | Sludge | | |
|---|---|---|---|---|---|---|---|---|---|---|---|---|---|
| | | $FeSO_4$ $7H_2O$ | $Fe_2(SO_4)_3$ | $H_2SO_4$ (96%) | Added Fe | Water | Per cent $FeSO_4$ | Per cent $Fe_2(SO_4)_3$ | Per cent $H_2SO_4$ | pH | Per cent $FeSO_4$ | Per cent $Fe_2(SO_4)_3$ | Per cent $FeSO_4$ Recovery |
| 1 | 150 | 73 | 27 | None | None | 169 | 12.1 | 2.8 | -------- | 2.1 | 14.6 | 5.0 | 22 |
| 2 | 150 | 73 | None | None | None | 196 | 5.4 | None | -------- | 3.3 | 15.8 | None | 68 |
| 3 | 150 | 73 | None | 12 | None | 184 | 13.2 | None | 4.1 | 1.8 | 14.7 | None | 13 |
| 4 | 150 | 73 | None | 12 | 8.6 | 184 | 4.9 | None | <0.1 | 4.2 | 28.4 | None | 83 |
| 5 | 125 | 73 | 27 | 12 | 17.9 | 157 | 23.2 | None | 0.1 | 4.3 | 26.9 | None | 53 |
| 6 | 70 | 73 | None | 12 | 7.3 | 150 | 23.6 | None | <0.1 | 4.1 | 23.8 | None | 6 |
| 7 | 150 | 73 | 27 | 12 | 18 | 157 | 8.2 | 1.2 | 0.1 | 2.1 | 27.7 | 2.9 | 85 |
| 8 | 175 | 73 | 27 | 12 | 18 | 157 | 2.0 | None | 0 | 3.5 | 36.5 | None | 97 |
| 9 | 150 | 73 | None | 12 | (¹) | 184 | 9.9 | 1.0 | 3.0 | 0.7 | 18.6 | 1.9 | 30 |

¹ 30 grams of Blooming Mill Scale were added. This scale contains Fe, FeO, $Fe_2O_3$, and $Fe_3O_4$.

A comparison of solution 1 with solution 2 shows that substantial quantities of ferric sulfate interfere with the separation of ferrous sulfate sludges, even in sulfuric acid-free solutions. On the other hand, small quantities of ferric sulfate up to about 3% are apparently harmless, as in solution 7.

Solution 3 shows that very low recoveries are obtained in the presence of substantial quantities of free sulfuric acid. Solutions 4-8 are examples of the results obtained at different operating temperatures when sufficient iron is added to convert the liquors to a reduced and substantially acid-free condition. Solution 9 illustrates the adverse effect of iron oxide when used as a neutralizing agent.

From these results it is evident that substantial recoveries of ferrous sulfate are obtained from

UNITED STATES PATENTS

| Number | Name | Date |
|---|---|---|
| 857,793 | Daniels et al. | June 25, 1907 |
| 2,005,120 | Whetzel et al. | June 18, 1935 |

FOREIGN PATENTS

| Number | Country | Date |
|---|---|---|
| 365,981 | Great Britain | Jan. 28, 1932 |

OTHER REFERENCES

Mellor, Comprehensive Treatise on Inorganic and Theoretical Chemistry, 1935, vol. 14, page 248, Fig. 640. Published in New York by Longmans, Green and Company.

Britton, Hydrogen Ions, 1929, vol. 3, page 278, table 80. Published in New York by D. Van Nostrand Co., Inc.